United States Patent [19]

Kolycheck et al.

[11] Patent Number: 4,467,078

[45] Date of Patent: Aug. 21, 1984

[54] ELECTRON BEAM CURABLE POLYURETHANE COMPOSITIONS

[75] Inventors: Edmond G. Kolycheck, Lorain; Laura L. Tolle, Richfield, both of Ohio

[73] Assignee: The B. F. Goodrich Company, Akron, Ohio

[21] Appl. No.: 548,385

[22] Filed: Nov. 3, 1983

Related U.S. Application Data

[62] Division of Ser. No. 404,152, Aug. 2, 1982.

[51] Int. Cl.³ .................. C08F 283/06; C08G 65/32; C08L 75/04
[52] U.S. Cl. ..................................... 525/455; 525/404; 525/408; 525/411; 525/412; 525/415; 525/438; 525/454; 525/920; 204/159.19
[58] Field of Search ............... 525/404, 440, 441, 454, 525/455, 408, 411, 412, 415, 438, 920

[56] References Cited

U.S. PATENT DOCUMENTS 3,493,634  2/1970  Kolycheck ........................ 525/440
4,188,455  2/1980  Howard ........................... 525/440
4,254,230  3/1981  Howard ........................... 525/440

*Primary Examiner*—John C. Bleutge
*Assistant Examiner*—A. L. Carrillo
*Attorney, Agent, or Firm*—J. Hughes Powell, Jr.; Nestor W. Shust

[57] ABSTRACT

Improved electron beam curable compounds are prepared by mixing 100 weight parts of (1) polyurethanes prepared from polymeric polyols, organic diisocyanates and polyethers having terminal hydroxyl and unsaturated groups, or terminal hydroxyl and pendant unsaturated groups with (2) 1 to 25 weight parts of an acrylate or alkacrylate terminated polyurethanes prepared by reacting isocyanate terminated prepolymers of hydroxyl terminated polymers with hydroxyl-terminated acrylates or alkacrylates. Compositions of this blend may be crosslinked or cured in a few seconds by electron beam to provide an improved stable coating that can be cured to a variety of hardnesses. These polyurethanes combined with phenoxy resins also form particularly useful binder systems for magnetic tape.

2 Claims, No Drawings

ELECTRON BEAM CURABLE POLYURETHANE COMPOSITIONS

This is a division of application Ser. No. 404,152, filed Aug. 2, 1982.

BACKGROUND OF THE INVENTION

Polyurethanes prepared from polyether or polyester polyols, organic diisocyanates and polyethers having terminal hydroxyl and unsaturated groups, or terminal hydroxyl and pendant unsaturated groups, are soluble in solvents for deposition on a carrier that after removal of the solvent can be wound and processed as by calendaring and slitting immediately after removal from a solvent drying oven without layer to layer adhesion or other disruption of the coating. After such processing, the binder compositions containing the polyurethane may be crosslinked or cured by electron beam to provide a crosslinked polymer. These polyurethanes are useful in magnetic recording media wherein the magnetic coating contains a magnetic material, usually a ferri-magnetic material, embedded in a binder matrix of these polyurethanes and small amounts of other additives such as lubricants, dispersants, conductive agents and the like. However, these materials are limited by the amount of cross-linking or the degree of cure obtainable in electron beam cures. Systems having more flexibility are desired.

U.S. Pat. No. 4,255,243 discloses photo-crosslinkable unsaturated poly-(carbonate-urethanes) obtained by condensing a diisocyanate with a polycarbonate-diol and a lower hydroxyalkyl acrylate. U.S. Pat. No. 4,260,703 discloses radiation curable urethane-acrylates prepared by reacting an alkoxylate of an ester diol such as 2,2-dimethyl-3-hydroxypropyl-2,2-dimethyl-3-hydroxypropionate with a diisocyanate, capped with a hydroxyalkyl acrylate such as hydroxyethyl acrylate. U.S. Pat. No. 4,264,752 discloses compositions formed by the reaction of a polycarbonate polyol, a polyisocyanate and a hydroxy acrylate monomer as hydroxyethyl acrylate that can be used as radiation curable coatings. Also U.S. Pat. No. 4,254,230 discloses actinic radiation-curable unsaturated polyetherester urethanes in the presence of air. These are complex polymers containing at least one unsaturated urethane oligomer, said oligomer comprising the reaction product of at least one unsaturated active hydrogen-containing compound, at least one polyisocyanate, and at least one polyether-ester. The amount of said unsaturated compound being present in amount molar equivalent to the isocyanate compound. None of these compounds are completely satisfactory as polyurethanes for electron beam curing for magnetic tape applications.

SUMMARY OF THE INVENTION

Improved electron beam curable compounds are obtained from mixtures of 100 weight parts of (1) polyurethanes prepared from polymeric polyols, organic diisocyanates, and polyethers having terminal hydroxyl and unsaturated groups, or terminal hydroxyl and pendant unsaturated groups with (2) 1 to 25 weight parts of acrylate or alkacrylate terminated polyurethanes prepared by reacting isocyanate terminated prepolymers of hydroxyl terminated polymers with hydroxyl terminated acrylates or alkacrylates. Compositions of these blends may be crosslinked or cured in a few seconds by exposure to an electron beam to provide improved stable coatings that can be cured to a variety of hardnesses. These polyurethanes combined with phenoxy resins also form particularly useful binder systems for magnetic tape.

DETAILED DESCRIPTION

In accordance with this invention the electron beam curable polyurethane compounds include, (1) as one essential component, polyurethanes of hydroxyl terminated polyesters, polylactones, polyethers, polycarbonates, polyhydrocarbons, polyepihalohydrins and the like. The polyurethanes are readily prepared from a variety of compounds having terminal functional groups reactive with organic isocyanates. Normally used are hydroxyl-terminated compounds having molecular weights greater than about 300 to 400 to 10,000. The most commonly used compounds or macropolyols are hydroxyl-terminated polyesters, polyethers, polyacetals, polycarbonates, polyepihalohydrins, polybutadienes and polyacrylates, alone or in a mixture, having molecular weights greater than about 400, optionally with polyfunctional chain extenders such as diols. Useful materials are obtained from mixtures of a macroglycol and a small polyfunctional polyol chain extender such as an alkylene glycol or ether glycol, a cycloaliphatic glycol, or an aromatic-aliphatic glycol, and the like. In the so-called prepolymer technique an excess of organic diisocyanate is first reacted with the macroglycol and unsaturated polyester or polyether and then the small difunctional chain extender added, normally in amounts equivalent to react with substantially all of the free isocyanate groups.

The hydroxyl (polyalkylene oxide), or polyether macroglycols, preferably are essentially linear hydroxyl-terminated compounds having ether linkages as the major linkage joining carbon atoms. The molecular weights may vary between about 400 and 10,000, usually to about 2,000. The hydroxyl (polyalkylene oxide)s as hydroxyl poly (tetramethylene oxide), hydroxyl poly (trimethylene oxide), hydroxyl poly (hexamethylene oxide), hydroxyl poly (ethyllene oxide) and the like of the formula $HO[(CH_2)_nO]_xH$ wherein n is a number from 2 to 6 and x is an integer, and alkyl substituted types such as hydroxyl poly (1,2-propylene oxide); tetrahydrofuran and ethylene oxide copolyethers; and the like.

The polyester glycols include linear hydroxyl-terminated polyesters having molecular weights between about 400 and 10,000, usually about 2,000. The polyesters utilized include those prepared by the polyesterification of aliphatic dicarboxylic acids including, for example, malonic, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 1 to 10 carbon atoms, preferably 4 to 6 carbon atoms. The phthalic acids are also useful. The glycols used in the preparation of the polyesters by reaction with the dicarboxylic acids are normally aliphatic polyols containing between 2 and 10 carbon atoms, usually 2-6, such as ethylene glycol, propanediol, butanediol, hexamethylene glycol, decamethylene glycol, 2-ethylhexanediol-1,6, neopentyl glycol and the like; 1,4 cyclohexanedimethanol; and aromatic polyols or bis-1,4(-hydroxyethoxy) benzene. Poly-esteramides also are contemplated, usually by substitution of a diamine or amino alcohol for at least part of the glycol.

Poly(epsilon-caprolactone)diols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4, hexamethylene glycol and the like. Ethylene glycol provides excellent polyesters.

The lactones preferred for preparing the polyesters are epsilon-caprolactones having the general formula

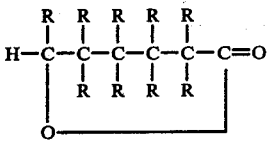

wherein at least 6 of the R's are hydrogen and the remainder are hydrogen or alkyl groups containing 1 to 10 carbon atoms, preferably methyl. Mixtures of lactones may be employed to form the polyesters as epsiloncaprolactone and trimethyl-epsilon-caprolactone, α-methyl-epsilon-caprolactone, β-methyl-epsiloncaprolactone, dimethyl-epsilon-caprolactone and the like. The lactones are polymerized readily by heating with the bifunctional reactant to a temperature of about 100° to about 200° C. Catalysts may be employed if desired. Particularly preferred are poly(epsilon-caprolactone)diols having molecular weights in the range of about 400 to about 10,000, normally to about 2,000.

Polyacetals are generally prepared by the reaction of an aldehyde and a polyhydric alcohol with an excess of the alcohol, including for example, reaction products of aldehydes such as formaldehyde, paraldehyde, propionaldehyde, butyraldehyde, valeraldehyde, acrolein and like reacted with glycols; for example, ethylene glycol, hexanediol, diethylene glycol and the like which are well known to those skilled in the art. Generally, the polyacetals may be considered to be reaction products of aldehydes and glycols. The molecular weights of the polyacetal will be varied from about 400 to 10,000, normally about 2,000.

Typical polyhydrocarbonurethanes useful in the practice of the invention will include hydroxyl terminated liquid polymers having an aliphatic polymeric backbone prepared by polymerizing at least one vinylidene monomer having at least one terminal $CH_2<$ group per monomer molecule together with at least one hydroxyl containing disulfide as is described in U.S. Pat. No. 4,120,766. Such liquid polymers may have a backbone derived from, for example, ethylene, isobutylene, butadiene, acrylate and methacrylate esters alone or with other vinylidene monomers such as styrene or acrylonitrile as is described in the aforementioned patents. Other methods for making hydroxyl containing liquid polymers are well known such as reacting an aminoalcohol with a liquid carboxyl terminated polymer having backbones of the type disclosed above. The molecular weight of these materials will range from about 400 to 5,000.

The polycarbonate glycols include reaction products of polyols and phosgene or organic carbonate compounds. Of the polyols, poly(oxyalkylene glycol)s may have the general formula $HO(R'O)_xH$ wherein R is an alkylene radical containing 2 to 10 carbon atoms and x is an integer, typically from 1 to 5. The alkylene glycols normally contain 2 to 10 carbon atoms. Typical materials include, for example, ethylene glycol, 1,4-butanediol, 1,6-hexanediol, diethylene glycol, 1,2-propylene glycol, dipropylene glycol, 2-ethyl-1,6-hexanediol, 1,5-pentanediol, 1,4-cyclohexanediol, 1,2,6-hexanetriol, polyoxyethylene glycols and triols, polyoxypropylene glycols and the like. The organic carbonates may have the formula

wherein the R's are alkyl radical containing 1 to 8 carbon atoms, and cyclic radicals containing 6 to 10 carbons in the ring. Typical compounds include dimethyl carbonate, diethyl carbonate, dipropyl carbonate, diphenyl carbonate, dicyclohexyl carbonate, and the like. Polyurethanes of this invention made with poly(hexamethylene carbonate) glycol are readily cured and have good properties.

One essential component of the electron beam curable polyurethanes is a copolyether selected from the group consisting of polyethers having a single terminal double bond or vinyl group and a terminal hydroxyl group; and polyether glycols with with pendant double bonds or vinyl groups, there being an average of from about ½ to about 18 such double bonds per molecule. About 1 to 3 double bonds represents a typical range. The copolyethers are prepared from tetrahydrofuran, alkylene oxide and hydroxyalkyl esters of acrylic or methacrylic acid. These materials may be represented by the formula

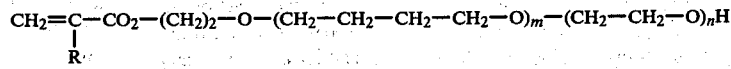

wherein R is H or methylene, m is a number from 4 to 20, and n is a number from 3 to 13. Normally these copolyether acrylates and methacrylates have a molecular weight range from about 400 to 2,000. The alkylene oxides may contain 2 to 4 carbon atoms and ethylene oxide is typical. A preferred group of materials have molecular weights from 400 to above 2,000.

Typical polyetherglycols containing pendant groups containing double bonds include tetrahydrofuran based ether glycols. For example, copolyethers of tetrahyrofuran and allyl glycidyl ether, and copolyethers of tetrahydrofuran, alkylene oxides containing 2 to 3 carbon atoms, i.e. ethylene oxide, and allyl glycidyl ether. A typical polyetherglycol with pendant groups can have the structural formula

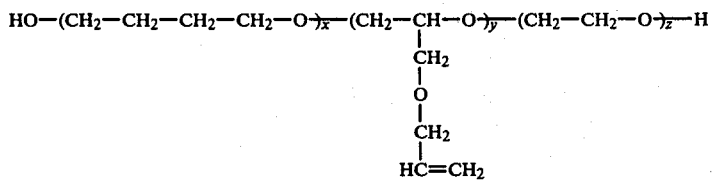

wherein x is 4 to 20, y is 1 to 18 and z is 0 to 13. Typical molecular weights are MOVS/n/ (OH) about 500 to 1,400 and the polymers contain about 50 to 60 mole percent tetrahydrofuran, about 50 to 60 mole percent ethylene oxide and about 5 to 50 mole percent allyl glycidyl ether. The amount of terahydrofuran in the polymers may be varied from about 5 to 95 mole percent, more normally from about 40 to 60 mole percent; with from about 100 to about 5 weight percent allyl glycidyl ether or methallyl glycidyl ether, with the remainder an alkylene oxide such as ethylene oxide or other oxides containing from 2 to 3 carbon atoms. There may also be pendant acrylate or methacrylate groups. A preferred group of materials have molecular weight from 400 to 2,000.

As to the amounts of the these unsaturated polyethers used, there is normally used up to about 20 weight percent of the copolyethers containing one terminal hydroxyl and one terminal acrylate or methacrylate group, usually about 3 to 12 weight percent of the total of copolyether and polyol used, i.e. from about 0.04 to 0.23 mols per mol of the other polyols. The polyether glycols containing pendant unsaturation may be used in amounts from about 5 to 100 weight percent of the total polyols used, usually about 25 to 75 weight percent. Mixtures of these two types of unsaturated polyethers may be used.

The molecular weight range of these unsaturated polyethers is from about 300 to 2,000, normally about 400 to 1,400.

If small glycols are used as chain extenders with the macropolyols and the organic diisocyanate, these normally are aliphatic glycols or ether glycols containing 2 to 10 carbon atoms. Typical glycols which have been employed include ethylene glycol, propylene glycol, butanediol-1,4, hexanediol, 2-ethylhexanediol-1,6, neopentyl glycol, 1,4-butenediol, 2-butene-1,4-diol, and the like. Cycloaliphatic glycols such as cyclohexanedimethanol, and aromatic-aliphatic glycols such as bis-1,4-(β-hydroxyethoxy)benzene, may also be employed.

The amount of glycol chain extender used with the macropolyol and the diisocyanate may vary from about 0.1 to 10 mols per mol of macroglycol. Excellent polyurethanes are obtained with a molar ratio of one mole of macropolyol and 1 to 5 mols of the small chain extender glycol. Substituted glycols also may be used.

The organic polyisocyanates which are reacted with the macropolyols, unsaturated polyethers and optional polyol will include, for example, alicyclic, aliphatic and aromatic diisocyanates. Such aliphatic diisocyanates include for example, hexamethylene diisocyanate, methylenebis (4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, diphenyl methane diisocyanate, dibenzyl diisocyanate, diphenyl ether diisocyanates, bitolylene diisocyanates, m- and p-tetramethylxylene diisocyanate, and the like, for example diisocyanates of the formula

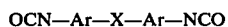

OCN—Ar—X—Ar—NCO wherein Ar is cyclic, i.e. an arylene or alicyclic radical, and X may be a valence bond, an alkylene radical containing 1 to 5 carbon atoms, or NR where R is an alkyl radical, oxygen, sulfur, sulfoxide, sulfone and the like.

About equimolar ratios of diisocyanate and total polyols i.e. —OH to NCO groups, may be used. When a small polyol chain extender is also used, the ratio of reactants employed may be varied from about 1.5 to 13 mols of organic diisocyanate per mol total of macropolyol and unsaturated hydroxyl polyether with 0.5 to 12 mols of the polyol. The amount of organic diisocyanate used is dependent on the total amount of chain extender, unsaturated polyether and macropolyol, and normally is a molar amount essentially equivalent to the total of these latter reactants so that there are essentially no free unreacted isocyanate groups remaining in the polymer. Excellent polyurethanes have been obtained when a molar ratio of one mol total of macropolyol and unsaturated hydroxyl polyether of molecular weight about 800 to 4,000, 0.1 to 3 mols of diol chain extender and 2 to 4 mols of the diisocyanate are caused to react. While essentially equimolar amounts of isocyanate and active hydrogen groups are often preferred, it will be understood that small excesses of a reactant or excess organic diisocyanate can be used in forming prepolymers. Normally, there should be less than 0.005 percent by weight of unreacted isocyanate groups, preferably essentially no residual isocyanate groups, in the electron beam curable polyurethanes.

Catalysts may be used to speed up the polyurethane formulation and any of those catalysts normally used by those skilled in the art may be employed. Typical catalysts include dibutyltin dilaurate, stannous octoate, tertiary amines such as triethylamine and the like may be used, normally in amounts from about greater than 0.01 up to 10 phr or polyurethane, and more normally greater than about 0.025 up to 5 phr.

The other (2) essential component of the compounds of this invention are acrylate or alkacrylate terminated polyurethanes. These are prepared by first making an isocyanate-terminated polyurethane from a hydroxyl-terminated polymer with an excess of a diisocyanate, and then reacting this isocyanate-terminated polyurethane with hydroxy acrylates or alkacrylates to form the acrylate-terminated polyurethane.

A great variety of hydroxyl-terminated polymers may be used. These include the hydroxyl-terminated polyesters, polylactones, polyethers, polyepihalohydrins, polyhydrocarbons, polycarbonates and the like described herein above. Typical other hydroxyl-terminated materials include those described in the following U.S. Patents, the disclosures of which are incorporated herein and made a part hereof. U.S. Pat. No.

3,551,472 discloses hydroxyl-terminated polymers, such as copolymers of butadiene-1,3 and acrylonitirile and polymers of alkyl acrylates, with a diol. U.S. Pat. No. 3,712,916 discloses hydroxyl-terminated polymers prepared by reaction of carboxyl-terminated polymers with an alkylene oxide such as ethylene oxide in the presence of an amine catalyst. U.S. Pat. No. 3,850,856 discloses preparation of liquid hydroxyl-terminated epihalohydrins such as epichlorohydrin, prepared by cationic polymerization in the presence of water or ethylene glycol in the presence of a trialkyl oxonium salt of an $HMF_6$ catalyst. U.S. Pat. No. 4,120,766 teaches preparation of liquid hydroxyl containing polymers by polymerization of at least one vinylidene monomer with at least one hydroxyl containing disulfide (and trisulfide as in U.S. Pat. No. 4,238,397) in the presence of ultraviolet radiation. The molecular weight may be varied. Typical molecular weights from 300 to 3000 may be used, normally about 400 to 1200.

The diisocyanate may be any diisocyanate including diisocyanates of the types disclosed herein above for use in preparing the unsaturated polyethers used with these difunctional materials. A molar excess of the diisocyanate to liquid hydroxyl-terminated polymer is used so that an isocyanate-terminated prepolymer is obtained for further reaction with the hydroxyl acrylate or alkacrylate.

The hydroxyacrylate or alkacrylate includes acrylic acid and alkacrylic acid derivatives, including methacrylic acid and ethacrylic acid. Typical compounds include hydroxymethyl acrylate, 2-hydroxyethyl acrylate, 2-hydroxyethyl methacrylate, 2-hydroxypropyl acrylate, 2-hydroxypropyl methacrylate, 2-hydroxyethyl ethacrylate, diethylene glycol monoacrylate, diethylene glycol monomethcarylate and the like. Useful materials may be represented by the formula

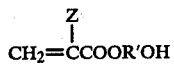

wherein Z is hydrogen, methyl, ethyl or propyl, and R' is a divalent alkylene radical containing 2 to 8 carbon atoms, preferably 2 to 3 carbon atoms. An excess of these hydroxyalkyl acrylyl compounds is reacted with the isocyanate terminated prepolymers to insure that essentially all of the polyurethane molecules are acrylate terminated. The acrylate terminated molecules have an average of greater than 1.5 terminal acrylate groups per molecule, preferable about 2 terminal groups per molecule. It is understood that the term "acrylate" includes both acrylates and alkacrylates.

The acrylate terminated polymers include liquid polymers that normally have viscosities of about 2500 to 30,000 centipoises, preferably about 3000 to about 6000. Solubility in organic solvents as methyl ethyl ketone, dimethyl formamide, tetrahydrofuran, cyclohexanone and the like is useful. The acrylate terminated polymers may be mixed with the other unsaturated polyurethanes of the compounds of this invention by any conventional method. Normally it is added to a solution of the unsaturated polyurethane which normally is deposited, for example, on a film as for use in magnetic recording media. This is used from about 1 to 25 weight parts of the liquid acrylate terminated polyurethane per 100 weight parts of the unsaturated polyurethane.

Alkyl acrylates and methacrylates may be mixed with the acrylate terminated polymers if desired. Any acrylate ester may be used, but better results have been obtained with polyfunctional acrylates. Typical materials include 1,6-hexanediol diacrylate, trimethylol propane trimethacrylate, tripropylene glycol diacrylate, and the like. The amounts used, based on the mixture with the acrylate terminated polymer, may be varied from about 5 to about 50%, more usually, about 10 to 25%.

Particularly useful in magnetic tape applications is a binder combination of the novel polyurethanes of this invention combined with a phenoxy resin. The phenoxy resin, used in amounts of about 2 to about 100 parts by weight per 100 weight parts of polyurethane, is a thermoplastic, linear, high molecular weight copolymer of bisphenol A and epichlorohydrin, said copolymer having the molecular structure

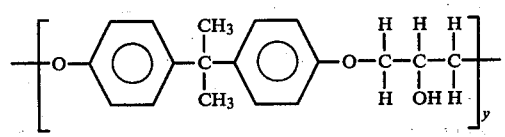

where y is a number of such magnitude that the molecular weight of said copolymer is within the range of about 20,000 to about 40,000, and preferably about 30,000.

These copolymers of epichlorohydrin/bisphenol A are well known materials commonly referred to as phenoxy resins. The plastics are commercially available under the trademark "Bakelite" phenoxy resins. One method for their preparation is described in U.S. Pat. No. 2,602,075. The thermoplastic phenoxy resins have melt-flow temperatures within the range of about 125° C. to about 150° C.

The compositions are conveniently prepared by blending the polyurethanes and the phenoxy resin as in solution. The three polymers are unexpectedly very compatible and form a remarkably homogeneous blend, this despite their widely differing chemical molecular structures. The improvement in processing characteristics of the blends compared to both the polyurethane and the phenoxy resin alone is apparent when the materials are milled and extruded. For instance, the tendency of the hot plastics to stick to the mill is reduced by the mixing thereof, and better surface appearance and higher extrusion rates are obtained. A further advantage of the use of the electron beam curable polyurethanes is to decrease or prevent any exudates from the phenoxy resin.

The compositions of this invention may also have incorporated therein small amounts, e.g., from about 0.1 to 20 parts per hundred parts by weight of the polyurethane, of well known elastomers modifiers to serve as mechanical processing aids, for example, inert fillers such as silica, and lubricants such as calcium stearate.

The compositions of this invention are soluble in various solvents such as dimethyl formamide, dioxane, cyclohexanone tetrahydrofuran, and methyl ethyl ketone. The most useful solutions contain from about 10 to about 30 weight percent of the polymer mixture. More rapid solubilization of the compositions is obtained by moderate heating, i.e., to around 30° C. to 50° C. Coatings of the polymer blend may applied from the aforesaid solutions on the surfaces of metals and fabrics by the well known operations of spraying, dipping, knife or roller coating. Films are produced by the usual method of casting from solution and removing the solvents.

The films and coatings of the mixture of polymers have superior physical properties than previous unmodified polyurethane.

In the following examples, the unsaturated polyurethanes were prepared by first melting the polyether or polyester glycol, adding the unsaturated hydroxy polyether, chain extender the organic diisocyanate and heating to complete the reaction to form the polyurethane. The temperature range employed is usually greater than 50° C. to about 250° C. The reaction is conducted in the substantial absence of moisture as under vacuum or dry nitrogen. In the following Examples, the liquid acrylate terminated polyurethane used was prepared by charging 666 weight parts of isophorone diisocyanate to a reactor under nitrogen. 0.67 weight part of stannous octoate catalyst was added with agitation, and 670 weight parts of poly(tetramethylene adipate)glycol, M.W. 670 was slowly added. The reaction temperature was maintained at about 70° to 80° C. When the reaction was completed, 0.27 weight parts of phenothiazine was first added, then 534.1 weight parts or 2-hydroxyethyl acrylate chilled to 10° C. was added. The reaction was continued at 70° to 80° C. until the unreacted isocyanate in the mixture was less than 0.05%. The resulting liquid acrylate terminated polyurethane was used as is. The methacrylate polyurethane is readily prepared with hydroxymethyl methacrylate, and other diisocyanates such as tolylene diisocyanates may be used as well as diphenylmethane-4,4'-diisocyanate. In most of the examples there was included a stabilizer, Irganox 1010 tetrakis-[methylene 3-(3,5-di-t-butyl-4-hydroxyphenyl)-propionate].

The unsaturated polyurethanes were dissolved in tetrahydrofuran (THF) to form about 25% (15-40%) solutions, the liquid acrylate terminated polyurethane added thereto and the solution cast on release paper, and dried at 110° C. The samples were then cured with electron beam radiation. For 5 or 10 megarad dosages the films were exposed to a 5 milliamp, 185,000 volt beam at a rate of 22 feet per second linear speed of the film, and at 10 milliamps to provide a dosage of 10 megarads. Normally the range of exposure may be from about 0.5 to less than 15 megarads, the latter being such that if often adversely effects the physical properties of the polymers. A more useful range is about 1 to 12 megarads.

Cure is evidenced by decrease in elongation and increased modulus of the polyurethanes, as well as insolubility and a low swell in tetrahydrofuran. Samples that have not crosslinked or cured will dissolve or break up in tetrahydrofuran, while cured samples will only swell, and the less the swell the tighter the cure.

EXAMPLE I 747.44 weight parts (0.873 mole) of poly (tetramethylene adipate) glycol, molecular weight 856 and 52.56 weight parts (0.584 mole) of 1,4-butanediol were mixed and heated to 120° C. and 200 grams (0.318 mole) of monohydroxy polyether monoacrylate was added. This monoacrylate has the formula shown herein above and contains a terminal hydroxyl and acrylate group. The unsaturated polyether has a hydroxyethyl acrylate content of 7.6, an OH functionality of approximately 1.2, an OH number of 89.3, a molecular weight of MOVS/n/ (OH) of 628, and contains 40.3 mole % ethylene oxide. 1.616 moles (404 weight parts) of diphenylmethane-4,4'-diisocyanate was dissolved in the melt, along with 0.1 percent by weight on the polyol blend Irganox 1010 stabilizer, and the mixture heated to complete the reaction to form the polyurethane. 100 weight parts of the resulting polyurethane were dissolved in tetrahydrofuran, and there was added to this solution 10 weight parts of the acrylate terminated polyurethane described above, coated on release paper dried, and exposed to an 8 megarad electron beam dosage. A sample without the acrylate terminated polyurethane was prepared as a control and exposed to an 8 megarad dosage. The exposed samples were tested for stress strain properties according to ASTM procedure No. D412, and tested for solubility or percent swell in tetrahydrofuran. The control had a tensile strength at break of 19.65 GPa, an elongation of 310%, and a 100% modulus of 6.20 GPa. The mixed polyurethanes exposed as described had tensile strengths of 20.33 GPa, a 230% elongation, and a 100% modulus of 7.58 GPa.

EXAMPLE II 600 weight parts (0.702 mole) of poly(tetramethylene adipate) glycol, molecular weight 855, was melted and heated to 120° C. There was dissolved in this melt 150 weight parts (0.128 mole) of a polyether glycol with pendant unsaturated groups. This polyether had a molecular weight MOVS/n/ (OH) of 1175 and contained copolymerized tetrahydrofuran, 54.5 mole %, 37.7 mole % ethylene oxide and 7.8 mole % allyl glycidyl ether. 25 weight parts of 1,4-butanediol (0.278 moles), 1.105 weight parts of diphenyl-methane-4,4-diisocyanate and 0.2 weight parts on polyol blend of Irganox 1010 stabilizer were added to the melt and the mixture heated to complete the reaction. A 25% THF solution of this polyurethane was prepared and 10 weight parts of the liquid acrylate terminated polyurethane was added thereto. Films were cast from this compound solution and exposed to 8 megarad dosages by the electron beam. A sample without the acrylate terminated polyurethane was prepared as a control and exposed to 8 megarad dosages. The mixed polyurethanes exposed as described had a tensile strength of 26.53 GPa, an elongation of 440%, 100% modulus of 3.44 GPa and a 300% modulus of 10.34 GPa. The percent area swell of the sample in THF was 280%, showing the state of cure obtained with only a few seconds exposure to the electron beam.

The control sample exposed as described had a tensile strength of 26.53 GPa, an elongation of 650%, 100% modulus of 3.10 GPa and 300% modulus of 5.17. In tetrahydrofuran, the control broke into pieces.

EXAMPLE III 600 weight parts of poly(tetramethylene adipate) glycol, molecular weight 830 (0.724 moles) was heated to melt the glycol. 150 weight parts (0.128 mole) (20% of the mixture) of a tetrahydrofuran polyether containing pendant unsaturated groups and composed of 54.5 mole % tetrahydrofuran polymerized with 37.7 mole % ethylene and 7.8 mole % allyl glycidyl ether, MOVS/n/ (OH) 1175, was added to the melt, along with 52.2 weight parts of 1,4-butanediol (0.580 mole), 358 weight parts of diphenylmethane-4,4-diisocyanate (1.432 moles) and 0.2 weight parts of Irganox 1010 stabilizer, and the melt heated to complete the formation of the polyurethane. 10 weight parts of the liquid acrylate terminated polyurethane was dissolved in the THF solution. Films were cast and exposed to the electron beam for an 8 megarad dosage. The sample had a tensile of 35.83 GPa, a 310% elongation, a 100% modulus of 7.56 GPa, a 300% modulus of 25.84 GPa, and an area swell in THF of 206%.

EXAMPLE IV 0.936 mole of poly(tetramethylene ether)glycol, molecular weight 855 was heated and mixed with 0.170 mole of a copolymer of tetrahydrofuran, allylglycidyl ether and ethylene oxide having a MOVS/n/ (OH) molecular weight of 1175, an average of about 1.5 pendant double bond per molecule and an ethylene oxide content of 37.7 mole % tetrahydrofuran, 54.5%; and 7.8% allylglycidyl ether. 0.128 mole of 1.4-butanediol and 1.234 moles of diphenyl methane-4,4-diisocyanate were added and the mixture heated above 100° C. to complete the reaction. A 25% solid solution of 100 weight parts of this polymer was prepared in THF and 10 weight parts of the acrylate terminated polyurethane described above added, films prepared and exposed to an 8 megarad dosage with the electron beam. The control sample had a tensile of 22.43 GPa, 760% elongation, a 100% modulus of 1.72 GPa, a 300% modulus of 3.10 GPa, and a THF area swell of 800. The blended sample had a tensile of 13.44, an elongation of 380%, a 100% modulus of 2.41 GPa, a 300% modulus of 7.24, and an area swell of only 380% in THF, all showing the excellent cure obtained with the mixture of polyurethanes of this invention.

EXAMPLE V 600 weight parts (0.701 mole) of poly (tetramethylene adipate) glycol, molecular weight 830 and 42.2 weight parts (0.469 mole) of 1,4-butanediol were mixed and heated to 120° C. and 32 grams (0.051 mole) of monohydroxy polyether monoacrylate was added. This monoacrylate has the formula shown herein above and contains a terminal hydroxyl and acrylate group. The unsaturated polyether had a molecular weight of MOVS/n/ (OH) of 628, and contains 40.3 mole % ethylene oxide, 52.2 mole % THF, and 7.6 mole % acrylate. 1.196 moles (299 weight parts) of diphenylmethane-4,4'-diisocyanate was dissolved in the melt, along with 0.1% Irganox 1010 stabilizer, and the mixture heated to complete the reaction to form the polyurethane. The resulting polyurethane was dissolved in tetrahydrofuran. 10 weight parts of the liquid acrylate terminated polyurethane was added, and the solution was coated on release paper dried, and exposed to an 8 megarad electron beam dosage. The sample had a tensile strength at break of 41.34 GPa, an elongation of 380%, a 100% modulus of 6.2 GPa, a 300% modulus of 21.31 and on a swell in tetrahydrofuran of 242%.

The novel electron beam curable polyurethane compounds of this invention are of particular value in magnetic media coatings in that they provide rapid and reproducible cured coatings that are harder and less elastomeric, providing dimensional stability to heat and increased resistance of the coatings to softening by frictional heat, and subsequent distortion or unusual wear. Further, the adhesion of the cured coating to the backing is improved. These advantages are in addition to the processing and handling advantages of the uncured binder formulations including processing stability, non-blocking rapid reproducible cure that are of particular rapid reproducible cure value in magnetic tape and discs.

We claim:

1. An electron beam-curable composition comprising (A) 100 weight parts of a polyurethane reaction product of (1) hydroxyl terminated polyesters, polyethers, polycarbonates, polylactones or, polyhydrocarbon macropolyols, (2) unsaturated polyethers having an average of ½ to 5 double bonds per molecule selected from the group consisting of polyethers having one terminal hydroxyl group and one terminal double bond group and polyether glycols having pendant double bond groups, and (3) an organic diisocyanate, and (B) from about 2 to about 100 parts by weight of a thermoplastic, linear copolymer of bisphenol A and epichlorohydrin, said copolymer having the molecular structure

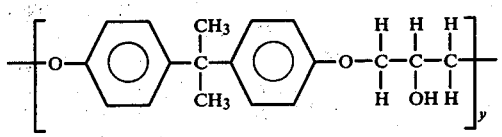

where y is a number of such magnitude that the molecular weight of said copolymer is within the range of about 20,000 to about 40,000 and (C) one to 25 parts of a liquid acrylate or alkacrylate terminated polyurethane.

2. The composition of claim 1 wherein in (A) the (1) polyethers have the formula $HO[(CH_2)_xO]_yH$ wherein x is 2 to 6 and y is an integer, the polyesters are polyesters of acids of the formula $HOOC-R-COOH$ wherein R is an alkylene radical containing 1 to 10 carbon atoms and glycols containing 2 to 10 carbon atoms, and the polyurethane contains from 0 to 10 mole per mole of polyester or polyether of an aliphatic glycol or aliphatic ether glycol chain extender containing 2 to 10 carbon atoms, (3) the organic diisocyanate has the formula $OCN-Ar-X-Ar-NCO$ wherein Ar is cyclic radical and X is a valence bond an alkylene radical containing 1–5 carbon atoms, and (B) is from about 2 to about 100 parts by weight of a thermoplastic, linear copolymer of bisphenol A and epichlorohydrin, said copolymer having the molecular structure

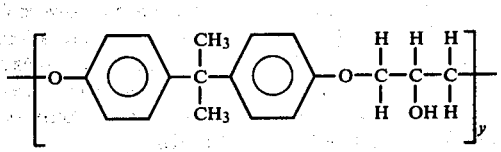

where y is a number of such magnitude that the molecular weight of said copolymer is about 30,000 and wherein (C) is a polyurethane reaction product of a hydroxyl terminated polyester, polyether, polylactone, polycarbonate or polyhydrocarbon, an organic diisocyanate and a hydroxyacrylate or hydroxyalkacrylate.

* * * * *